United States Patent Office 3,004,948
Patented Oct. 17, 1961

3,004,948
MOLTEN COMPOSITION COMPRISING POLYVINYL ESTER AND OCTADECANEDIOL, AND PROCESS FOR MAKING SAME
Guido von Rosenberg and Walter Brotz, Gersthofen, near Augsburg, Germany, assignors to Farbwerke Hoechst Aktiengesellschaft vormals Meister Lucius & Brüning, Frankfurt am Main, Germany, a corporation of Germany
No Drawing. Filed July 24, 1958, Ser. No. 750,582
Claims priority, application Germany July 27, 1957
9 Claims. (Cl. 260—33.4)

The present invention relates to compositions of matter comprising polyvinyl esters and a process for their manufacture.

Commercial polyvinyl acetates and polyvinyl propionates possess high melt viscosities as also do the low-molecular weight types thereof. These high melt viscosities prohibit processing the material from the fused mass as it is desired, for example, when using cast-in materials or for the coating of sheets and papers according to the hot-melt process.

In order to be able to use polyvinyl acetate and polyvinyl propionate for these purposes, it is necessary to reduce their melt viscosities to such an extent that they may still be processed at temperatures ranging between 100° C. and 200° C.

Said reduction in viscosity can be attained by adding solvents or plasticizers such as phthalates. These solvents, however, have to be removed from the mixture after the latter has been processed up. In the first place, this procedure is rather expensive and, secondly, a complete elimination of the solvent is imposible since residues of these substances are persistently retained by the high-polymeric substance. When working according to this method there is, consequently obtained a material which has an undesirable odor.

If, on the other hand, plasticizers are employed which remain in the final product, the latter is greatly prejudiced in its mechanical properties. The plasticizers, moreover, may start undesirable side-reactions by migration, especially in sheets.

Now, we have found that octadecane-diol, a hard, wax-like substance obtained, for example, by the energetic hydrogenation of castor oil (1,12 octadecane-diol) or by the epoxylation of oleic acid and subsequent reduction can, at temperatures ranging from 100° C. to 200° C., be easily and homogeneously incorporated into polyvinyl acetate and/or polyvinyl propionate in amounts up to 50%, suitably of more than 2%, and preferably ranging from 10% to 30%, calculated on the total mixture (i.e. calculated practically on the total amount of polyvinyl ester and octadecane-diol). The viscosity of polyvinyl acetate and/or polyvinyl propionate is thereby reduced to such an extent that corresponding mixtures can already be processed at 120° C. in the above-mentioned manner.

When adding octadecane-diol, the reduction in viscosity is much more pronounced than when using the same amounts of plasticizer such as dioctyl phthalate. It is, however, of decisive importance that in the mixtures according to the invention polyvinyl acetate or polyvinyl propionate maintain their characteristic properties, such as hardness, strength and toughness, while these qualities would be destroyed by the addition of a plasticizer. It is, moveover, advantageous that octadecane-diol reduces the tendency of polyvinyl acetate and polyvinyl propionate to agglomerate at a raised temperature and/or at a higher pressure (blocking) while imparting to these substances an ivory aspect which is desirable for many purposes. The low melt viscosity, moreover, facilitates the admixture of fillers of all kinds, such as carbon black, kaolin, diatomaceous earth and inorganic or organic pigments, such as iron oxide, titanium dioxide, zinc sulfide, barium sulfate, Berlin blue, chromous oxide, minium, phthalocyanine dyestuffs, and the like.

By the addition of octadecane-diol, the viscosity of melts of polyvinyl acetates or polyvinyl propionates can be improved, which should suitably have a K-value of 20–80, preferably 30–70. However, good results are also obtained when adding octadecane-diol to polyvinyl acetates or polyvinyl propionates having higher or lower K-values. Such mixtures containing polyvinyl acetate or polyvinyl propionate may, for example, be used for the coating of paper, cardboard, wood, etc., in order to provide these materials with a waterproof, heat-sealing coating.

The following examples serve to illustrate the invention, but they are not intended to limit it thereto:

*Example 1*

There were determined the melt viscosities at 120° C. of polyvinyl acetate (of a molecular weight of about 20,000) as well as of mixtures thereof with 20% dioctylphthalate or 20% octadecane-diol. The mixtures were prepared by admixing the polyvinyl acetate with the additive which had been heated to 140° C. and stirring the mixture at this temperature until the melt was homogeneous. The following results were obtained:

| | Polyvinyl Acetate (molecular weight about 20,000) | | |
|---|---|---|---|
| | In a pure state | +20% by weight of dioctyl phthalate | +20% by weight of octadecanediol |
| Viscosity in centipoises at 120° C.. | 57,000 | 7,900 | 2,800 |

Because of its high viscosity, the pure material cannot be processed by casting or coating by means of rollers, while the mixtures with octadecane-diol may be processed in this manner.

*Example 2*

There were measured the changes in the mechanical strength of polyvinyl acetate in the pure state having a molecular weight of 20,000 and of mixtures thereof with various additives having viscosity-reducing properties:

| | In a pure state | +20% by weight of dioctyl-phthalate | +20% by weight of octadecane-diol |
|---|---|---|---|
| Breaking load [1] in grams | 1,610 | 200, does not break, flabby. | 1,100 |
| Indentation hardness [2] (ball pressure test) elastic deformation. | 40 | No longer measurable. | 44 |
| Permanent deformation | 150 | Too soft | 270 |

[1] Measured by a bilaterally supported test bar having a cross section of 4 x 6 mm.
[2] Depth of penetration (in 10⁻³ mm.) of a ball having a diameter of 5 mm. under a load of 10 kilos/5 sec.

The above figures show that the mechanical properties of products containing plasticizers are highly and detrimentally affected although the viscosity of such a fused mass is by far higher than that of mixtures of polyvinyl acetate with octadecane-diol.

Obviously many modifications and varations of the present invention are possible in the light of the above teachings. It is, therefore, to be understood that within the scope of the appended claims the invention may be practiced otherwise than as specifically described.

We claim:
1. A composition of matter comprising at least one polyvinyl ester of a saturated fatty acid having from 2 to 3 carbon atoms and 2 to 50 percent of octadecane diol calculated upon the total mixture.
2. A composition of matter comprising at least one polyvinyl ester of a saturated fatty acid having from 2 to 3 carbon atoms and 10 to 30 percent of octadecane diol, calculated upon the total mixture.
3. A composition of matter comprising at least one polyvinyl ester of a saturated fatty acid having from 2 to 3 carbon atoms and 10 to 30%, calculated upon the total mixture, of octadecane diol, said polyvinyl ester having a molecular weight of about 20,000.
4. A coating composition consisting essentially of a mixture comprising at least one polyvinyl ester of a saturated fatty acid having from 2 to 3 carbon atoms and 2 to 50%, calculated upon the total mixture, of octadecane diol.
5. A composition of matter comprising at least one polyvinyl ester of a saturated fatty acid having from 2 to 3 carbon atoms and 2 to 50 percent of 1,12 octadecane diol, calculated upon the total mixture.
6. A composition of matter consisting essentially of a mixture of polyvinyl acetate and 10 to 30 percent of octadecane diol comprising 1,12 octadecane diol, calculated upon the total mixture.
7. A composition of matter as claimed in claim 6 which additionally contains an inert pigment.
8. A process for the manufacture of hot melts of at least one polyvinyl ester of saturated fatty acids from 2 to 3 carbon atoms, which melts have a reduced viscosity which comprises adding to the hot melt of said polyvinyl esters 2 to 50 percent, calculated upon the total mixture, of octadecane diol to produce a homogeneous molten mixture.
9. A process as claimed in claim 8 wherein 10 to 30 percent of octadecane diol calculated upon the mixture of polyvinyl ester and octadecane diol is added.

No references cited.